May 30, 1939. R. ZELIGMAN ET AL 2,160,099
SELF-CLEANING WINDSHIELD
Filed March 29, 1938
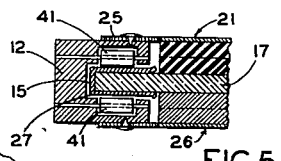
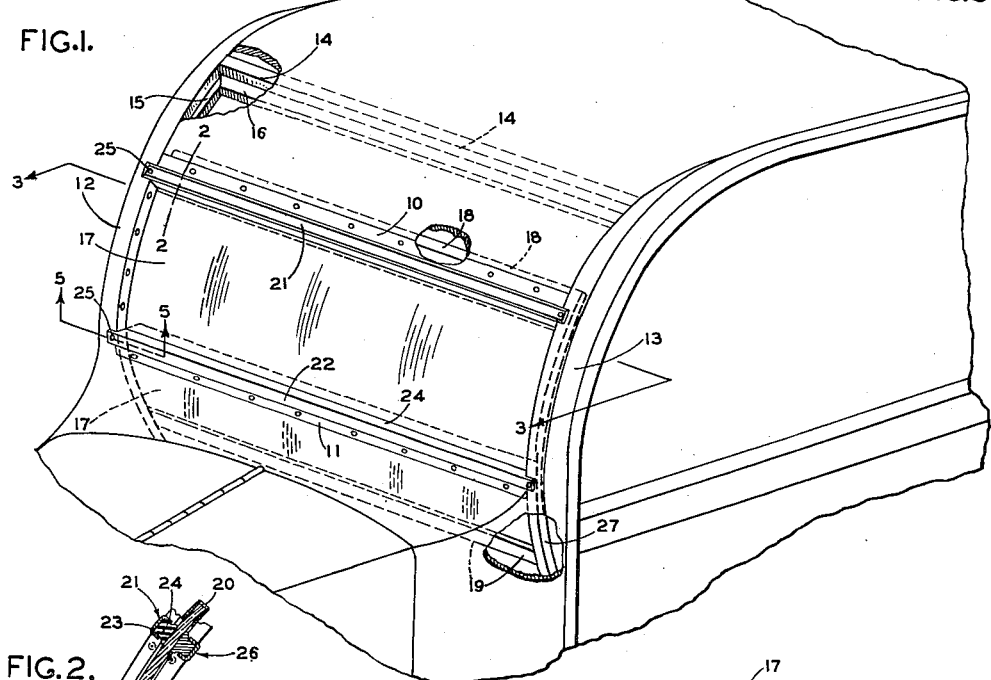
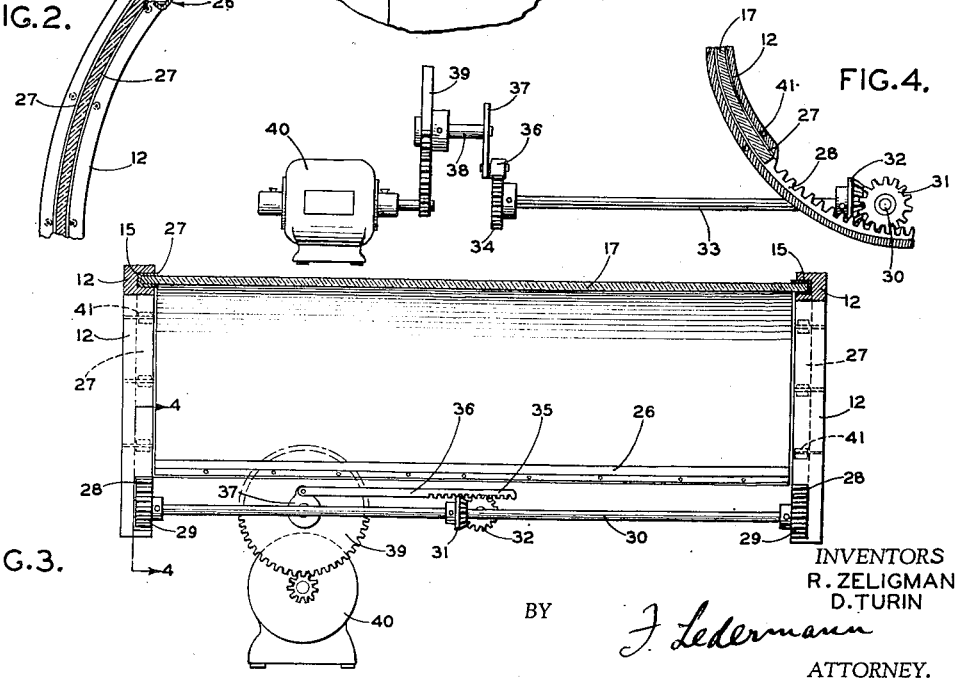
INVENTORS
R. ZELIGMAN
D. TURIN
BY F. Ledermann
ATTORNEY.

Patented May 30, 1939

2,160,099

UNITED STATES PATENT OFFICE 2,160,099

SELF-CLEANING WINDSHIELD

Rubin Zeligman and David Turin, Brooklyn, N. Y.

Application March 29, 1938, Serial No. 198,650

1 Claim. (Cl. 15—250)

The main object of this invention is the provision of a movable curved windshield for automobiles adapted to cooperate with stationary wipers, whereby the entire area of the windshield may be wiped clean of rain or moisture.

A further object of the invention is the provision of interior as well as exterior wipers, so that the inner surface of the windshield may be kept free from fog or mist.

The above and other objects will become apparent in the description below, in which characters of reference refer to like-named parts in the accompanying drawing.

It is pointed out that the drawing and the description are intended to present only one way in which the objects of the invention may be carried out, and no attempt has been made to present an actual adaptation of the invention to an automobile in all its details, as such details are best left to the manufacturer installing the device. The details set forth have been chosen because of the simplicity of their presentation in order to best illustrate the invention in the simplest manner.

Referring briefly to the drawing, Figure 1 is a fragmentary perspective view of an automobile, partly in section, equipped with the windshield of this invention.

Figure 2 is a cross-sectional view taken on the line 2—2 of Figure 1.

Figure 3 is a cross-sectional view taken on the line 3—3 of Figure 1.

Figure 4 is a cross-sectional view taken on the line 4—4 of Figure 3.

Figure 5 is a cross-sectional view taken on the line 5—5 of Figure 1.

Referring in detail to the drawing, the numeral 10 represents the upper windshield moulding of an automobile and the numeral 11 the lower moulding. The comformation of the body of the vehicle, from the roof down to the cowl, is cylindrical, so that the two side posts or side frame members 12 and 13 are arcuate. These frame members 12 and 13 continue on upward and join the side roof members, and at a certain distance upward from the moulding 10, which will be explained below, a cross-member 14 extends between the two side members 12 and 13.

On their inner, mutually opposed sides, the side members 12 and 13 are provided with arcuate grooves 15, and the forward side of the cross-member 14 is provided with a groove 16 having its ends joining the upper ends of the grooves 15.

A cylindrically concave section 17 of glass is slidably mounted in the opposed grooves 15, and is adapted to be moved upward and downward therein, the groove 16 providing a limit to the permissible upward movement of the glass. The arcuate length of the glass is that between its upper edge 18 and its lower edge 19. To protect the upper and lower edges of the glass, they are preferably covered with strips 20 of metal or other desirable material.

Bridged across the outside of the windshield, one just below the top moulding 10 and the other just above the bottom moulding 11, are a pair of wipers 21 and 22. These each comprise a metal frame or channel 23 embracing a rubber bar 24 whose one surface is flush against the outer surface of the glass. These wipers may be mounted in any desired manner, and in the illustrations they are shown for simplicity, tacked or screwed against the side frames 12 and 13 by means of their projecting ears 25.

Similarly bridged across the inside of the windshield, each directly behind one of the wipers 21 and 22, are a pair of inside wipers 26, similarly constructed and similarly attached, except that felt is preferably used instead of rubber.

Each side edge of the glass is covered with a strip or moulding 27 throughout its arcuate length. Each of the mouldings 27 are extended at their lower ends and are provided with arcuate racks 28. Pinions 29, on the ends of a wide shaft 30, mesh with racks 28. A bevel gear 31, intermediate the length of the shaft 30, meshes with a bevel gear 32 at right angles thereto on a shaft 33 extending forward (of the vehicle). On the other end of the shaft 33 a pinion 34 is fixed and lies in engagement with a rack 35 on one end of a connecting rod 36. The other end of the rod 36 is pivotally attached near the center of a wheel 37 which is rigid on the same shaft 38 with a gear 39, the latter being driven by an electric motor 40. No means is shown for keeping the rack 35 always against the gear 34, but any suitable arrangement may be provided. In fact, the entire mechanical means for operating the windshield, just described, is illustrated merely as an example of how the windshield may be mechanically operated, and it is not desired to limit the invention in any way by the said means, as any other suitable operating means may be provided.

When the electric motor 40 is energized, by means of a switch in an electric circuit, not shown, or in any other way, rotation of the gear 39 and wheel 37 is started. Such rotation causes, as is obvious, reciprocating movement of the rack 35, so that the gear 32, and hence gear 31, is rotated a distance first in one direction and then the same distance in the opposite direction. Hence, the arcuate racks 28, and with them the glass 17, are raised and lowered alternately, the degree of such raising and lowering of the glass being such as to cause the glass to move through an arc equal to the arcuate distance between the upper windshield moulding 10 and the lower moulding 11. To facilitate the movement of the glass, rollers 41 may be provided at intervals in the grooves 15. As the glass thus moves up and down between the outer rubber wipers 21 and the inner felt wipers 26, rain or moisture are wiped off the outer surface of the glass and fog off the inner surface. Thus, the entire opening through the windshield is cleaned, resulting in a fully clear vision through the glass.

Obviously, modifications in form and structure may be made without departing from the spirit and scope of the invention.

We claim:

In a vehicle having a windshield opening therein, the body frame at the sides and top of said opening being cylindrically arched upward and rearward, said frame including a pair of windshield side members having oppositely disposed arcuate grooves therein, a cylindrically arched glass slidably mounted in said grooves, means for moving said glass alternately upward and downward in said grooves, and rigid wipers bridging said opening and lying in slidable contact with said glass.

RUBIN ZELIGMAN.
DAVID TURIN.